US005818618A

United States Patent [19]
Eastmond

[11] Patent Number: 5,818,618
[45] Date of Patent: Oct. 6, 1998

[54] HIGH-SPEED SERIAL SIMPLEX BROADCAST DATA DISTRIBUTION USING OPTICS

[75] Inventor: Bruce Charles Eastmond, Downers Grove, Ill.

[73] Assignee: Motorola, Inc., Schaumburg, Ill.

[21] Appl. No.: 621,029

[22] Filed: Mar. 22, 1996

[51] Int. Cl.$^6$ .............................. H04J 14/02; H04B 10/10
[52] U.S. Cl. ..................... 359/163; 359/127; 359/128; 359/159
[58] Field of Search ..................... 359/127, 128, 359/163, 159

[56] References Cited

U.S. PATENT DOCUMENTS

| | | | |
|---|---|---|---|
| 4,063,083 | 12/1977 | Cathey et al. | 359/163 |
| 4,499,608 | 2/1985 | Broockman et al. | 359/163 |
| 5,245,680 | 9/1993 | Sauter | 359/163 |
| 5,335,361 | 8/1994 | Gheam | 359/163 |
| 5,500,523 | 3/1996 | Hamanaka | 359/163 |
| 5,521,733 | 5/1996 | Akiyama et al. | 359/128 |
| 5,619,359 | 4/1997 | Redmond et al. | 359/163 |

FOREIGN PATENT DOCUMENTS

| | | | |
|---|---|---|---|
| 0042333 | 3/1983 | Japan | 359/163 |
| 0126339 | 7/1984 | Japan | 359/163 |
| 0158634 | 9/1984 | Japan | 359/163 |
| 0005639 | 1/1990 | Japan | 359/163 |

*Primary Examiner*—Leslie Pascal
*Attorney, Agent, or Firm*—Darleen J. Stockley

[57] ABSTRACT

A positioning device (100) provides adaptive positioning for at least a first optical signal to facilitate a serial simplex broadcast between one of: a plurality of transmit communication units and a receive communication unit and at least a first transmit communication unit and a plurality of receive communication units. The transmit communication unit (102) includes an optical transmitter unit (104) for generating a free-space, collimated light beam (126), and the receive communication unit (106) includes an optical receiver unit (108) for detecting a portion of light beam (126) for communication between the transmit communication unit (102) and the receive communication unit (106).

8 Claims, 2 Drawing Sheets

200

300

400

HIGH-SPEED SERIAL SIMPLEX BROADCAST DATA DISTRIBUTION USING OPTICS

FIELD OF THE INVENTION

This invention relates generally to optical data communication systems and, in particular, to the transmission of high-speed serial data from a plurality of optical transmitters to one receiver, or from one optical transmitter to a plurality of optical receivers.

BACKGROUND OF THE INVENTION

As semiconductor and computing technology advances throughout the world, there will be an increasing need for an economical means to transmit very high-speed data over relatively short distances among plug-in boards or modules located within a housing or card cage. For example, in the design of cellular radiotelephone base stations, high-performance computers, digital switches and video signal processors, there is often a need to distribute a high-speed serial stream of digital information from an originating circuit board to several other receiving circuit boards located within the same housing or card cage. This distribution configuration is generally referred to as serial simplex broadcast. It is usually necessary for such equipment to continue operation during insertion or removal of boards, which may occur during servicing or when the function or capacity of the system is changed. The digital information may consist of a clock signal or a digital data which originates from an analog-to-digital converter or other source. In cellular radiotelephone base station receivers designed to demodulate multiple channels of information, the receiver IF signal may be digitized with an A/D converter located on one board, while demodulation of the sampled signal may occur on a plurality of different cards.

Although distribution of digital information in a serial format minimizes the number of interconnections, the required data rate may become quite high. For example, transmission of the output from a 14-bit A/D converter operating at a sampling rate of 60 Msamples/s requires a serial bit rate of 840 Mbit/s. Parallel-format data may be transmitted in serial format at rates up to 1.25 Gbit/s by readily-available, self-clocking multiplexor/demultiplexor integrated circuits.

Electrical distribution of high-speed serial data among boards or modules by conventional means requires the use of either transmission lines located on the electrical backplane, or a separate transmission system employing coaxial cables and connectors. Separate coaxial cables and connectors are unattractive due to the size, weight, and cost of the components. Moreover, as known in the prior art, it is difficult to avoid impedance discontinuities on a backplane transmission line, especially where large fanouts are required and the backplane loading changes as boards are inserted or withdrawn. Impedance discontinuities result in distortion of high-speed data signals and increase the likelihood of bit errors and timing difficulties.

Alternatively, an optical fiber network could be used to distribute the high-speed data. Although fiber is a suitable medium for the transmission of high-speed data, fiber backplane connectors and couplers are relatively expensive, and fiber end preparation is a time-consuming hand assembly operation.

Free-space, unidirectional optical links between two boards, known in the prior art, may be operated in tandem to relay data from board to board, but the link will be interrupted when boards are inserted or removed.

Notched optical fibers and D-fiber, known in the prior art, may be used to couple light from one board to another, but structures large enough to facilitate alignment will propagate multiple modes, which reduces the cutoff frequency and limits the information transfer rate.

Free-space and substrate-wave backplanes using holographic optical elements (HOEs) to refract a collimated laser beam are known in the art, but practical developments of this technology must overcome limitations caused by registration and alignment errors, and chromatic aberration caused by the dispersive properties of the HOEs and variations in the emission wavelength of typical laser diodes. Structures with improved performance are more complex.

Accordingly, what is needed is a means for distributing a high-speed serial stream of digital information from one plug-in circuit board to several other plug-in circuit boards located within the same housing or card cage which is inexpensive, compact, and operates consistently regardless of the number of plug-in circuit boards present.

DETAILED DESCRIPTION OF A PREFERRED EMBODIMENT

Figure 1:
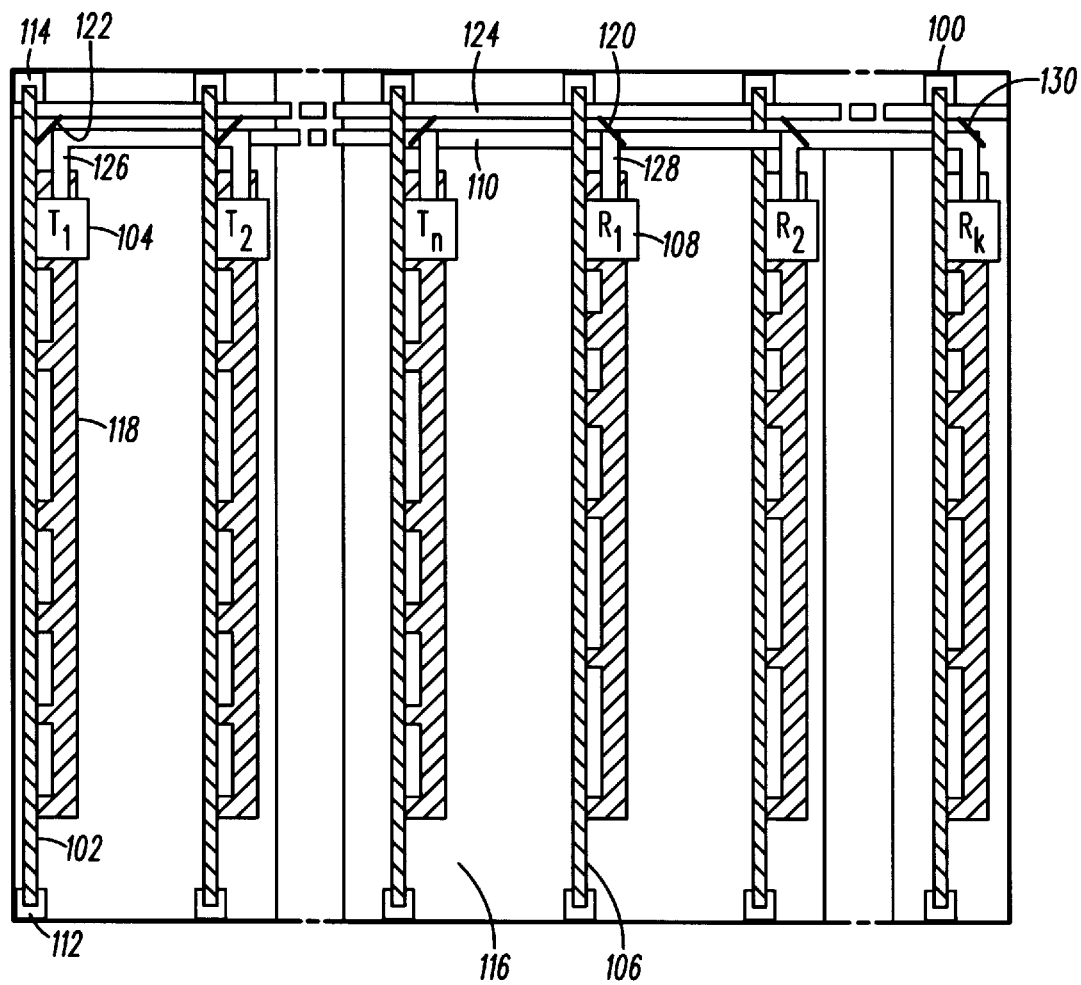
FIG. 1 is a front view of a positioning device containing one or more transmit communication units and one or more receive communication units in accordance with the present invention.

FIG. 1, numeral 100, is a front view of a positioning device that includes one or more transmit communication units, for example (102), and one or more receive communication units, for example (106). The transmit communication unit (102) includes an optical transmitter unit (104) for generating a free-space, collimated light beam (126) having an optical power, $P_o$, wavelength, and polarization. The receive communication unit (106) includes an optical receiver unit (108) for detecting a portion of a light beam (126) for communication between the transmit communication unit (102) and the receive communication unit (106). The use of free space as a transmission medium avoids information rate limitations due to the existence of multiple modes in a guiding structure.

The transmit and receive communication units are positioned by means of positioning guides, for example (112) and (114), which are attached to the positioning device (100) in accordance with a predetermined scheme. Transmit and receive communication units are typically detachably connected to an electrical backplane (116) by a mating electrical connector system (118) as is known in the art.

A bridging unit (124) is typically connected to an electrical backplane. Coupled to the bridging unit (124) are a first deflecting unit (122), an optical beamsplitting/deflecting unit (120), and a terminal deflecting unit (130), that are associated with both the optical transmitter unit of each of the n transmit communication unit(s), and the optical receiver unit of each of the k receive communication unit(s), where $n \geq 1$ and $k \geq 1$, n and k integers. For n>1, it is necessary that each optical transmitter unit must be orthogonal to all other optical transmitter units in wavelength, or polarization, or time.

The beam-splitting/deflecting unit has a specified ratio of transmittance to reflection. Plate, cube, pellicle, penta or holographic beamsplitters, all known in the art, may be employed. The terminal deflecting unit changes the beam direction by 90° without changing its intensity. A terminal deflecting unit may be realized, for example, by a first-surface mirror.

The transmittance-to-reflection ratio may be advantageously selected for each optical beam-splitting/deflecting unit so that equal optical power from each optical transmitter unit is combined and delivered to each optical receiver unit. Neglecting losses in the deflecting units, the optical power of the combined transmit beam (110) is simply equal to $n*P_o$, and the optical power available in the receiving beam (128) is $(n*P_o)/k$.

Each deflecting unit is connected to a bridging unit (124), which is connected to the positioning device so that the deflecting units have a predetermined orientation that enables communication between the transmit communication unit(s) and the receive communication unit(s). Since all beams lie within a plane parallel to the backplane, the side walls of the positioning device (100) may be constructed of a solid material so as to prevent eye contact with the beams.

Figure 2:
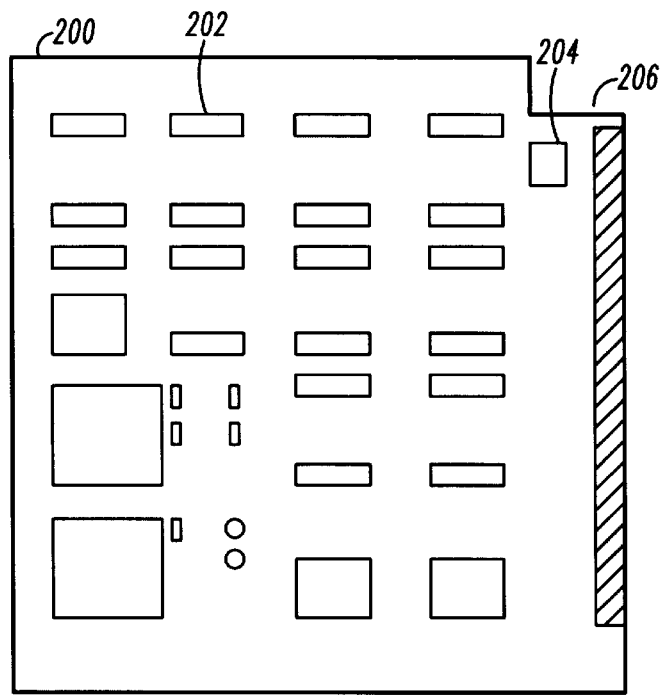
FIG. 2 shows a side view of a communication unit for use with the positioning device of FIG. 1.

FIG. 2, numeral 200, shows a side view of a communication unit (200) for use with the positioning device of FIG. 1. The communication unit may contain electrical circuitry, for example, an integrated circuit component (202). The optical communication unit (204) consists of either an optical transmitter unit (104) or an optical receiver unit (108). A notch (206) prevents interference between the communication unit (200) and the light beam (110) so that the presence or absence of a particular communication unit will not interrupt the light beam (110).

Figure 3:
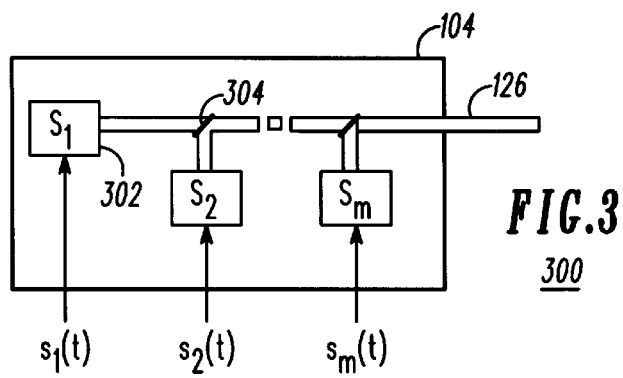
FIG. 3 shows a detailed view of an optical transmitter unit for use with the communication unit of FIG. 2

FIG. 3, numeral 300, shows a detailed view of an optical transmitter unit (104) for use with the communication unit of FIG. 2. The transmitter unit for generating the optical beam (126) includes at least one collimated-beam, intensity-modulated optical source, for example (302). A plurality of orthogonal optical sources operating at different wavelengths may be combined by means of at least one beam-splitting/deflecting unit, for example (304), in a manner known in the art. For the special case where two polarized sources having the same wavelength are to be combined with minimum loss, the beam splitting/deflecting unit (304) is polarized, and the source polarization planes are oriented so that the source polarization planes are mutually orthogonal and coincide with the polarization planes of the beam splitting/deflecting unit (304).

The optical transmitter unit (104) may advantageously employ low-cost, GaAlAs laser diodes designed for compact disk and video disk players. These diodes are manufactured at standard wavelengths ranging from 750 to 840 nm, exhibit substantially linear polarization oriented parallel to the junction plane, and may be modulated at frequencies ranging up to 1 GHz. Optical correction of the output is required to produce a collimated beam, since the angular dispersion of the laser output is typically ±8° in the plane parallel to the junction plane and ±22.5° in the plane perpendicular to the junction plane.

Figure 4:
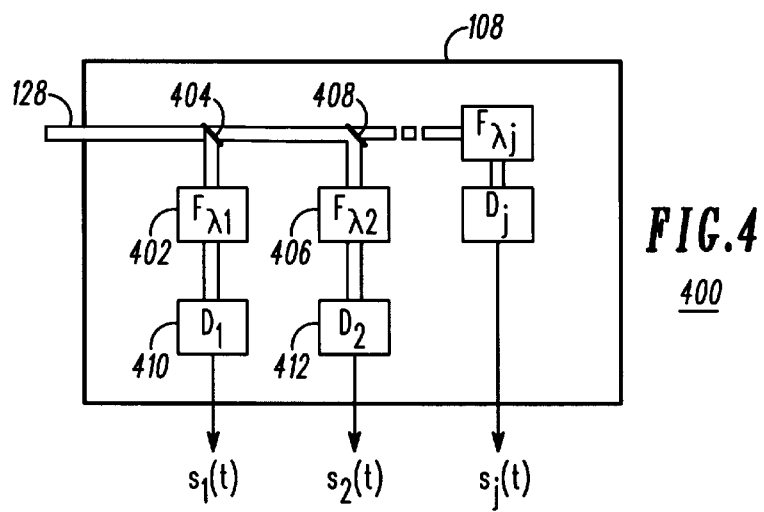
FIG. 4 shows a detailed view of an optical receiver unit for use with the communication unit of FIG. 2.

FIG. 4, numeral 400, shows a detailed view of the optical receiver unit (400) for use with the communication unit of FIG. 2. The optical receiver unit for receiving an optical beam (128) includes at least one optical detector (410; 412; . . . ), which may be a reverse-biased PIN silicon diode. A plurality of orthogonal optical sources operating at different wavelengths may be individually detected by means of at least one beam-splitting deflection unit, for example (404; 408; . . . ), and at least two bandpass optical filters, for example (402; 406; . . . ), in a manner known in the art. For the special case where it is desired to separate two orthogonally polarized sources having the same wavelength with minimum loss, the beam splitting deflection unit (404; 408; . . . ) is polarized and oriented so that its polarization planes coincide with the polarization planes of the sources.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A positioning device for deflecting at least a first optical signal from a transmit communication unit to facilitate a serial simplex broadcast between detachably connected transmit communication unit/units and detachably connected receive communication unit/units, the positioning device comprising:

A) a bridging unit, coupled to the at least first transmit communication unit, a first deflecting unit, at least a first beam splitting/deflecting unit, a terminal deflecting unit and at least a first receiving communication unit, for facilitating transmission of the at least first optical signal in free space, B) the first deflecting unit, coupled to the bridging unit, for deflecting the at least first optical signal in free space in accordance with a predetermined scheme to the at least first beam splitting/deflecting unit;

C) the at least first beam splitting/deflecting unit, coupled to the bridging unit, for splitting/deflecting the at least first optical signal in free space toward one of: a second beam splitting/deflecting unit and a terminal deflecting unit, to provide at least a first deflected optical signal wherein each beam splitting/deflecting unit is arranged for one of:

C1) combining a received deflected optical signal with another optical signal for deflection to at least a first predetermined receive communication unit; and C2) splitting the received deflected optical signal for deflection to the at least first predetermined receive communication unit; and D) the terminal deflecting unit, coupled to the bridging unit, arranged for deflecting the received deflected optical signal in free space to a last receive communication unit, wherein the beam-splitting/deflecting unit uses a beam splitting ratio that provides an optical signal having equalized power transmission to each receive communication unit, and wherein the positioning device is a card cage having transmit communication units and receive communication units that comprise detachable circuit modules wherein operation of the positioning device is uninterrupted by insertion/removal of circuit modules.

2. The positioning device of claim 1 further including transmitting the at least first optical signal toward at least a second transmit communication unit that is detachably connected to the bridging unit and that transmits a second optical signal with a wavelength/polarization different from a wavelength/polarization of the first optical signal, toward a second beam splitting/deflecting unit of the bridging unit.

3. The positioning device of claim 1 wherein at least a second receive communication unit, detachably connected to a bridging unit, is arranged to receive another deflected optical signal.

4. The positioning device of claim 1 wherein the beam-splitting/deflecting unit uses a beam splitting ratio that provides an optical signal having equalized power contributions from each transmit communication unit.

5. The device of claim 1 where the beam splitting/deflecting units are arranged linearly along the bridging unit, and the transmit communication units and receive communication units are arranged orthogonally to the bridging unit.

6. A device for adaptive positioning of at least a first optical signal for at least one of:
   a plurality of transmit communication units that communicate with at least one receive communication unit and
   at least a first transmit communication unit that communicates with a plurality of receive communication units, wherein the positioning device deflects the at least first optical signal to facilitate a serial simplex broadcast, the device comprising:
   A) the first transmit communication unit, detachably connected to a bridging unit, for transmitting the at least first optical signal in free space toward a first beam-splitting/deflecting unit, and where selected, toward at least a second transmit communication unit, detachably connected to the bridging unit, for transmitting a second optical signal with a wavelength/polarization different from a wavelength/polarization of the first optical signal, toward the second deflecting unit of the bridging unit;
   B) the bridging unit coupled to at least a first deflecting unit, at least one beam-splitting/deflecting unit and a terminal deflecting unit that are arranged in accordance with a predetermined scheme for orienting the transmit communication unit/units and receive communication unit/units, the first deflecting unit, the beamsplitting/deflecting unit/units, and the terminal deflecting unit to allow free space communication between the transmit communication unit(s) and the receive communication unit(s), wherein:
      B1) the first deflecting unit is arranged for deflecting the at least first optical signal toward the second beam splitting/deflecting unit to provide at least a first deflected optical signal;
      B2) each beam splitting/deflecting unit is arranged for one of:
         B2a) combining the deflected optical signal with another optical signal for deflection to at least a first predetermined receive communication unit; and
         B2b) splitting the deflected optical signal for deflection to the at least first predetermined receive communication unit;
      B3) the terminal deflecting unit is arranged to deflect a remaining deflected optical signal to a last receive communication unit; and
   C) a first receive communication unit is detachably connected to the bridging unit, wherein the first receive communication unit is arranged to receive at least one deflected optical signal sent through free space and, where selected, at least a second receive communication unit, detachably connected to the bridging unit, where the second receiving communication unit is arranged to receive another deflected optical signal sent through free space,
wherein the beam-splitting/deflecting unit uses a beam splitting ratio that provides an optical signal having equalized power transmission to each receive communication unit, and wherein the positioning device is a card cage having transmit communication units and receive communication units that comprise detachable circuit modules wherein operation of the positioning device is uninterrupted by insertion/removal of circuit modules.

7. The device of claim 6 wherein the beam-splitting/deflecting unit uses a beam splitting ratio that provides an optical signal having equalized power contributions from each transmit communication unit.

8. The device of claim 6 where the deflecting units of the bridging unit are arranged linearly and the transmit communication units and receive communication units are arranged orthogonally to the bridging unit.

* * * * *